3,067,066
HIGH FERMENTABLE NON-CRYSTALLIZING SYRUP AND THE PROCESS OF MAKING SAME
Irving Ehrenthal, University City, and George J. Block, St. Louis, Mo., assignors to Anheuser-Busch, Inc., St. Louis, Mo., a corporation of Missouri
No Drawing. Filed Nov. 3, 1958, Ser. No. 771,230
14 Claims. (Cl. 127—38)

This invention relates to the production of a syrup by multiple hydrolysis of starch, and more specifically to a high fermentable non-crystallizing syrup, and to the process of making same.

In the past, syrups were produced by hydrolysis of starch with mineral acids under pressure. The extent of conversion or hydrolysis would be determined by the total amount of reducing sugars expressed as dextrose (dextrose equivalent or D.E.). The maximum degree of conversion by the acid technique was limited because of an increased objectionable bitter taste, inherent or incipient amber color, development of haze during long shelf life, and because of the danger of dextrose crystallization in the finished syrups. For the above reasons, acid converted syrups above 58–60 D.E. are not commercially available or practicable.

The great demand by the food industry for syrups with increased sweetness necessitated attempts to prepare high conversion syrups without introducing an objectionable bitter flavor to the finished syrup. This led to the preparation of syrups in the range of 60–65 D.E. by a dual conversion consisting of an acid conversion and a subsequent enzymatic hydrolysis with a fungal amylase, such as described in the Dale et al. Patent No. 2,201,609. These dual conversion syrups were an improvement upon the simple acid converted syrups, and contained sugars that are yeast fermentable to the extent of 68–70% of the total carbohydrate material. However, when the conversion with fungal enzymes is carried to above 65 D.E., the syrup tends to crystallize due to the high dextrose concentration.

We have invented a method of preparing high fermentable corn syrup, i.e., yeast fermentable to the extent of about 80% to about 90% of the total carbohydrate material, which shows no undesirable tendency toward crystallization.

The principal object of the present invention is to provide a novel syrup and method of making same in which at least about 80% of the carbohydrate materials are yeast fermentable. Another object of this invention is the preparation of a syrup containing from about 80% to about 90% fermentable sugar which shows no tendency toward crystallization.

Still another object is to provide a novel multi-step conversion process for producing a syrup which has from about 80% to about 90% fermentable sugar and is non-crystallizing. A further object is to provide a novel conversion process for producing corn syrup having the above-mentioned characteristics, which includes the steps of an acid treatment and two asynchronous enzyme conversions in which a malt amylase is the initial saccharifying enzyme.

These and other objects and advantages will become apparent hereinafter.

Briefly, the present invention comprises subjecting an aqueous starch suspension to a limited acid conversion to produce a liquor having a dextrose equivalent between from about 17 to about 25. The resultant liquor is then subjected to the action of a malt amylase until a dextrose equivalent of from about 50 to about 55 is obtained. After the malt treatment, the liquor is further treated with a microbial amylase such as a fungal amylase until a syrup having at least 80% fermentable sugar and preferably from about 80% to about 90% fermentable sugar is attained. This syrup has a dextrose equivalent of from about 70 to about 75. Although a syrup prepared by this unique process contains from about 80% to about 90% yeast fermentable carbohydrates, the dextrose concentration of the syrup is sufficiently low so that no crystallization will occur, even after long storage. Under certain conditions we can treat the raw starch with a microbial enzyme to a D.E. of between about 17 to about 25 followed by the hereinbefore described malt amylase and microbial amylase treatments. Also under special conditions, we can treat the raw starch with a malt enzyme to produce a liquor having a D.E. of between about 50 to about 55 followed by the hereinbefore described hydrolysis with a microbial amylase to produce a high fermentable non-crystallizing syrup.

Any of the known commercial malt amylase preparations such as brewers' malt, distillers' malt, or green malt can be used in the process. The enzyme can either be extracted from the malt and added as an aqueous solution, or the ground malt can be directly added to the liquor. There are a number of enzyme preparations commercially available which can be used in the second enzyme treatment to give the final syrup the desired conversion characteristics. Among enzymes of this type which can be used in the present process are enzymes designated as Rhozyme S and Rhozyme 33 which can be obtained from Rohm & Haas Company, Philadelphia, Pennsylvania, Mylase C and Mylase SA which can be obtained from Wallerstein Co., Inc., New York, New York, and Hydrolase which can be obtained from Jacques Wolff & Co., Passaic, New Jersey.

Both enzymatic treatments are preferably carried out at the optimum temperature for the action of each particular enzyme. In each case, temperatures of from about 120° F. to about 130° F. appear to be the most favorable operating temperatures. However, if the temperature is too high the enzymes will be inactivated, and if it is too low, the reaction will not proceed to completeness or at a commercially practical rate.

The time of each enzyme treatment will depend on the nature and quantity of enzyme used, and on processing conditions. It is desirable for commercial purposes that the malt enzyme treatment be carried as far as it will go, i.e., to a dextrose equivalent of from about 50 to about 55. The fungal enzyme hydrolysis must be stopped before the amount of dextrose in the syrup is sufficient to cause it to crystallize. Crystallization normally occurs at about 44% or about 45% dextrose. In other words, while the malt enzyme can be allowed to act for as long as desired, the shortest length of time that can be used and still have the D.E. in the required range of about 50 to about 55 is preferable. Whereas, since the fungal enzyme continues to modify the sugars in the liquor, it must be controlled in order to get a syrup which is non-crystallizing. This reaction must not be allowed to proceed too far. The concentrations of enzymes also are a factor in determining the times of reaction. The higher the concentration, the shorter is the reaction time.

The pH of the enzymatic reactions can vary from between about 3 to about 7, but is preferably between about 4 to about 6, and more preferably from about 4.8 to about 5.0.

The acid conversion step is held below a dextrose equivalent of about 30 and preferably below about 25 in order to limit the amount of dextrose formed. This step results in a syrup having a D.E. of preferably from about 17 to about 25. This range represents a balance between quality of product and practical operation conditions.

The second step of treating the partially hydrolyzed acid converted syrup with a malt enzyme, should be carried on until the syrup has a dextrose equivalent of from about 50 to about 55. If it is stopped much below about 50, the syrup resulting from the final enzyme treatment will have a dextrose composition which is too high, and it will have a tendency to crystallize. The malt enzyme alone does not presently have the power to take the conversion above a dextrose equivalent of about 55.

The microbial amylases suitable for the third conversion step include the hereinbefore mentioned fungal amylases and bacterial amylases.

Under certain conditions, the acid conversion step can be eliminated, with the starch slurry being treated directly with the malt enzyme to the desired D.E. of about 50 to about 55, followed by the above described fungal amylase conversion step. The raw starch can also be converted with a microbial enzyme or enzymes to a liquor having a D.E. of about 17 to about 25, followed by the hereinbefore described malt amylase and fungal amylase conversion steps. However, from a practical viewpoint and when commercially producing this new product, it is preferable to include the acid conversion step with its limited hydrolysis. The enzymatic conversion of raw starch slurry with malt or microbial enzymes requires special equipment and techniques not usually available in a corn syrup refinery.

The method used to ascertain the fermentables in the succeeding examples is that set forth in a publication: "Method E-28-1, Fermentables, Tentative Standard 1-25-57 of Standard Analytical Methods of the Member Companies of the Corn Industries Research Foundation, Inc., 1001 Connecticut Avenue, Washington 6, D.C."

Where the dextrose concentration is referred to, it is calculated on a dry solids basis (D.S.B.), and is not directly related to the dextrose equivalent (D.E.).

EXAMPLE I

A starch slurry of 22–24° Baumé is hydrolyzed with hydrochloric acid (HCl), in a manner known to the art, to 20.0 D.E. The neutralized liquor is filtered with a filter aid and concentrated to 29.4° Baumé. The pH of the liquor is then adjusted to 5.0. 32 milliliters (ml.) of an aqueous extract of 4 parts water to 1 part distillers malt is added to 400 grams (g.) of the liquor. The suspension is agitated continuously at 122–126° F. until a dextrose equivalent of 52.5 is reached. A fungal amylase (0.1 g. of Hydrolase) is added to the liquor. The liquor is maintained at 122–126° F. with continuous agitation until a D.E. of 67.5 is obtained. The temperature is then raised to 170° F., and maintained at that temperature for 15 minutes in order to inactivate the enzymes. The liquor is carbon treated, filtered and concentrated in a manner known to the art. This syrup has 81.5% of its sugars fermentable by bakers' yeast and has a dextrose concentration of only 37.7%. This syrup has a high fermentables content, and is non-crystallizing upon standing.

EXAMPLES II

Four hundred g. of a 29.4° Baumé 20.0 D.E. acid converted corn liquor is adjusted to pH 5.0 and treated with 32 ml. of an aqueous extract of 4 parts water to 1 part distillers' malt at 122–126° F. until a D.E. of 52.5 is obtained. A fungal amylase (0.1 g. Mylase SA) is added to the liquor, and the conversion is allowed to continue at a temperature of 122–126° F. until a D.E. of 70.5 is reached. The enzymes are then heat inactivated at 170° F. for 10–15 minutes. When the liquor is analyzed for total yeast fermentable sugars, 85% of the sugars are found to be fermentable by the yeast, with the syrup being non-crystallizing upon standing.

EXAMPLE III 40 g. of ground distillers' malt are added to 2000 g. of 29.2° Baumé 20.0 D.E. acid converted liquor adjusted to pH 5.0. The liquor is maintained at a temperature of 125–128° F. with continuous agitation until a D.E. of 52.3 is obtained. A fungal amylase (0.53 g. of Mylase SA) is then added to the liquor, and the hydrolysis continued at a temperature of 125–128° F. until a D.E. of 71.2 is reached. The temperature is then raised to 170° F., and maintained at that temperature for 15 minutes in order to inactivate the enzymes. The liquor is carbon treated, filtered and evaporated. When the syrup solids are analyzed by the above described method, they are found to contain 85.5% yeast fermentable carbohydrates. This syrup showed no tendency to crystallize upon standing.

The following table will further illustrate the importance of a multiple acid and enzyme hydrolysis of starch, utilizing malt and fungal amylases, to achieve a high fermentable syrup with a dextrose concentration below about 45%.

Table No. 1

| Run | D.E. Acid Conversion | D.E. Malt Enzyme Conversion | Type Fungal Enzyme | Final D.E. | Percent Fermentables D.S.B. | Percent Dextrose D.S.B. |
|---|---|---|---|---|---|---|
| 1 | 48.0 | None | Mylase SA | 63.0 | 69.0 | 37.0 |
| 2 | 42.0 | 54.3 | Mylase C | 74.8 | -------- | 52.3 |
| 3 | 20.0 | 52.4 | ----do---- | 65.7 | 79.9 | 33.5 |
| 4 | 20 | 52.4 | Mylase SA | 70.4 | 85.3 | 41.1 |
| 5 | 20 | 52.4 | Hydrolase | 67.5 | 81.5 | 37.7 |
| 6 | 20 | None | Mylase SA | 66.8 | 74.7 | 41.0 |
| 7 | 20 | None | ----do---- | 70.0 | 75.8 | 45.0 |
| 8 | 20 | 52.3 | ----do---- | 68.9 | 83.9 | 39.5 |
| 9 | 20 | 52.3 | ----do---- | 71.2 | 85.8 | 41.0 |
| 10 | 19 | 52.3 | ----do---- | 68.3 | 83.6 | 38.0 |
| 11 | 20 | 52.3 | None | 52.3 | 69.0 | 15.6 |

From the foregoing table it can be seen that both the malt enzyme and fungal enzyme conversion are necessary to produce a syrup having the desired characteristics of a high fermentables content and of being non-crystallizing upon standing. Runs 1, 6, and 7 wherein the acid converted syrup is not treated with a malt enzyme, and run 11 wherein the malt converted syrup is not treated with a fungal enzyme, give a syrup which has a fermentables content which is decidedly below the desired range of about 80% to about 90%. Run 7, which has the highest fermentables (75.8%) of these four runs, has a dextrose concentration of 45.0% which means it has a tendency to crystallize.

Runs 3, 4, 5, 8, 9, and 10 give a very satisfactory syrup having a fermentables content of from about 80% to about 90% with the dextrose concentration well below 45%.

Run 2 results in a syrup having 52.3% dextrose and is crystalline thus showing that the acid conversion cannot go too far. Allowing the acid conversion to go too far results in syrup which has a tendency to crystallize or which has in fact crystallized. In any event, a product results which is not commercially saleable.

From the examples and the analytical data shown in Table I, it is apparent that this novel conversion process provides a method of producing a syrup containing carbohydrates of which from about 80% to about 90% are yeast fermentable, with a dextrose concentration below about 45%. Corn syrups which contain a dextrose concentration above about 44% or about 45% of the solids will exhibit crystallization upon storage, rendering them difficult to use commercially.

The temperature of the enzymatic hydrolysis should be favorable to the action of the specific enzyme used. We prefer to use a temperature range of from about 120° F. to about 130° F. for both enzyme treatments. However, as new enzymes are used, they may have other favorable environmental temperatures. The temperature is maintained continuously during the entire process. The pH of the acid converted liquor prior to the addition of the malt enzyme preferably should be adjusted to a value of from about 4.8 to about 5.0. This pH was selected because optimum activity of each of the enzymes is obtained at about pH 4.8 to about pH 5.0, and it is also the pH of the final syrup after processing. The concentration of each enzyme used in our process will depend on the time required to produce the finished product and on the cost of each enzyme. We prefer to use from about 1% to about 3% distillers' malt, and from about 0.04% to about 0.07% of fungal amylase based on total solids of acid converted liquor. However, as other amylases are developed, the amounts thereof may vary. Also if the cost of these microbial amylases decreases it may be desirable to use a larger amount of them to decrease the process time.

This novel syrup has numerous industrial applications. High fermentable corn syrups can be used in the baking industry, replacing the present solid sugars which are more expensive and more difficult to handle in bulk. These syrups can also be used in wine, beer or other fermentation industries. They can be used in any application where sweeteners are used, including but not limited to such uses as table syrups, canning, confections, jams, jellies and preserve preparations.

This invention is intended to cover all changes and modifications of the examples of the invention herein chosen for purposes of the disclosure, which do not constitute departures from the spirit and scope of the invention.

What is claimed is:

1. The process for producing a high fermentables non-crystallizing syrup, comprising the steps of subjecting an aqueous starch suspension to acidic conversion, subjecting the liquor resulting from acidic conversion to further conversion with a malt enzyme, subjecting the liquor resulting from the malt enzymatic conversion to further conversion with a microbial enzyme, and recovering a starch conversion syrup having at least about 80% of the carbohydrate materials yeast fermentable.

2. The process for producing a high fermentables non-crystallizing syrup, comprising the steps of subjecting an aqueous starch suspension to acidic conversion, subjecting the liquor resulting from acidic conversion to further conversion with a malt enzyme, subjecting the liquor resulting from the malt enzymatic conversion to further conversion with a fungal enzyme, and recovering a starch conversion syrup having at least about 80% of the carbohydrate materials yeast fermentable.

3. The process for producing a high fermentables non-crystallizing syrup, comprising the steps of subjecting an aqueous starch suspension to acidic conversion to produce a liquor having a dextrose equivalent below about 30, subjecting said liquor to further conversion with a malt enzyme, subjecting the liquor resulting from the malt enzymatic conversion to further conversion with a fungal enzyme, and recovering a syrup having at least about 80% of the carbohydrate materials yeast fermentable and having a dextrose concentration below about 45%.

4. The process for producing a high fermentables non-crystallizing syrup, comprising the steps of subjecting an aqueous starch suspension to acidic conversion to produce a liquor having a dextrose equivalent of from about 17 to about 25, subjecting said liquor to further conversion with a malt amylase, and subjecting the liquor resulting from the malt enzymatic conversion to further conversion with a fungal amylase to produce a syrup having from about 80% to about 90% of the carbohydrate materials yeast fermentable and having a dextrose concentration below about 45%.

5. The process for producing a high fermentables non-crystallizing syrup, comprising the steps of subjecting an aqueous starch suspension to acid conversion, subjecting the liquor resulting from the acidic conversion to further conversion with a malt amylase to produce a liquor having a dextrose equivalent of between about 50 and about 55, and subjecting said liquor to further conversion with a fungal amylase to produce a final syrup having from about 80% to about 90% of the carbohydrate materials yeast fermentable and having a dextrose concentration below about 45%.

6. The process for producing a high fermentables syrup, comprising the steps of subjecting an aqueous starch suspension to acid conversion to produce a liquor having a dextrose equivalent below about 25, subjecting said liquor to further conversion with a malt enzyme to produce a liquor having a dextrose equivalent of from about 50 to about 55, and subjecting said liquor to still further conversion with a fungal amylase to produce a final syrup having from about 80% to about 90% of the carbohydrate materials yeast fermentable, having a dextrose equivalent of at least about 70 D.E. and having a dextrose concentration below about 45%.

7. A non-crystallizing starch conversion syrup having more than about 80% of the carbohydrate materials yeast fermentable.

8. A high fermentables non-crystallizing starch conversion syrup having more than about 80% of the carbohydrate materials yeast fermentable and having a dextrose concentration of less than about 45%, said syrup being characterized by remaining a viscous liquid free of crystals upon standing.

9. A starch conversion syrup having from about 80% to about 90% of the carbohydrate materials yeast fermentable, having a dextrose equivalent of at least about 70 D.E. and having a dextrose concentration of less than about 45%, said syrup being characterized by remaining a viscous liquid free of crystals upon standing.

10. The process for producing a high fermentables non-crystallizing syrup, comprising the steps of subjecting partially converted starch liquor having a dextrose equivalent below about 25 to further conversion with a malt enzyme, subjecting the liquor resulting from the malt enzymatic conversion to further conversion with a microbial enzyme, and recovering a syrup containing at least about 80% of the carbohydrate materials yeast fermentable, said syrup being non-crystallizing upon standing.

11. The process for producing a high fermentables syrup, comprising the steps of subjecting partially converted starch liquor having a dextrose equivalent below about 25 to further conversion with a malt enzyme, and subjecting the liquor resulting from the malt enzymatic conversion to further conversion with a fungal enzyme to produce a final syrup having at least about 80% of the carbohydrate materials yeast fermentable, having a dextrose equivalent of at least about 70 D.E. and having a dextrose concentration below about 45%.

12. The process for producing a high fermentables syrup, comprising the steps of subjecting partially converted starch liquor having a dextrose equivalent below about 25 to further conversion with a malt enzyme to produce a liquor having a dextrose equivalent above about 50, and subjecting the liquor resulting from the malt enzymatic conversion to further conversion with a microbial enzyme to produce a final syrup having at least about 80% of the carbohydrate materials yeast fermentable and having a dextrose concentration below about 45%.

13. The process for producing a high fermentables syrup, comprising the steps of subjecting partially converted starch liquor having a dextrose equivalent below about 25 to further conversion with a malt enzyme to produce a liquor having a dextrose equivalent of between about 50 to about 55, and subjecting the liquor resulting from the malt enzymatic conversion to further conversion with a fungal enzyme to produce a syrup having from about 80% to about 90% of the carbohydrate materials yeast fermentable, having a dextrose equivalent of from about 70 to about 75 D.E. and having a dextrose concentration below about 45%.

14. A process for producing a high fermentable, non-crystallizing corn type syrup comprising the steps of subjecting a starch suspension to a limited acidic conversion, subjecting the liquor resulting from acidic conversion to further conversion with a malt enzyme, allowing the malt enzymatic conversion to proceed to substantial completeness, subjecting the liquor resulting from the malt enzymatic conversion to further conversion with a fungal enzyme, halting the fungal enzyme conversion before the dextrose concentration reaches about 45%, and recovering a corn type starch conversion syrup low in protein matter and having at least 80% of its carbohydrate materials yeast fermentable.

References Cited in the file of this patent

UNITED STATES PATENTS

| | | |
|---|---|---|
| 1,722,775 | Weber et al. | July 30, 1929 |
| 2,409,816 | Wadsweith | Oct. 22, 1946 |
| 2,571,541 | Cleland et al. | Oct. 16, 1951 |
| 2,790,718 | Nugey | Apr. 30, 1957 |
| 2,822,303 | Campbell | Feb. 4, 1958 |
| 2,880,094 | Nayhski | Mar. 31, 1959 |
| 2,891,869 | Langlois | June 23, 1959 |

FOREIGN PATENTS

| | | |
|---|---|---|
| 652,194 | Great Britain | Apr. 18, 1951 |